US008964979B2

(12) United States Patent
Altmann

(10) Patent No.: US 8,964,979 B2
(45) Date of Patent: Feb. 24, 2015

(54) IDENTIFICATION AND HANDLING OF DATA STREAMS USING CODED PREAMBLES

(75) Inventor: William Conrad Altmann, San Jose, CA (US)

(73) Assignee: Silicon Image, Inc., Sunnyvale, CA (US)

(*) Notice: Subject to any disclaimer, the term of this patent is extended or adjusted under 35 U.S.C. 154(b) by 0 days.

(21) Appl. No.: 13/269,450

(22) Filed: Oct. 7, 2011

(65) Prior Publication Data

US 2013/0089202 A1    Apr. 11, 2013

(51) Int. Cl.
    H04N 7/167       (2011.01)
    H04N 21/41       (2011.01)
    H04N 21/414      (2011.01)
    H04N 21/435      (2011.01)
    H04N 21/4363     (2011.01)
    H04N 21/4367     (2011.01)
    H04N 21/4408     (2011.01)
    H04N 21/81       (2011.01)
    H04N 13/00       (2006.01)

(52) U.S. Cl.
    CPC ..... *H04N 21/4122* (2013.01); *H04N 21/41407* (2013.01); *H04N 21/435* (2013.01); *H04N 21/43637* (2013.01); *H04N 21/4367* (2013.01); *H04N 21/4408* (2013.01); *H04N 21/812* (2013.01); *H04N 13/0048* (2013.01); *H04N 13/0066* (2013.01)
    USPC .............. 380/211; 380/200; 380/210; 725/31

(58) Field of Classification Search
    CPC ................ H04N 21/434; H04N 5/4401–5/76; H04N 21/04–21/631; H04W 28/06; G11B 2020/10537; G06F 3/14
    See application file for complete search history.

(56) References Cited

U.S. PATENT DOCUMENTS 4,517,669 A * 5/1985 Freeburg et al. .............. 370/329
5,241,382 A   8/1993 Paik et al.
(Continued)

FOREIGN PATENT DOCUMENTS

EP   2228985         9/2010
KR   10-2000-0060590  10/2000
(Continued)

OTHER PUBLICATIONS

"High-Definition Multimedia Interface Specification Version 1.3," HDMI Licensing LLC, Jun. 22, 2006, 237 pages.
(Continued)

*Primary Examiner* — Philip Chea
*Assistant Examiner* — Khoi Le
(74) *Attorney, Agent, or Firm* — Fenwick & West LLP

(57) ABSTRACT

Embodiments of the invention are generally directed to identification and handling of data streams using coded preambles. An embodiment of an apparatus includes an interface with a communication channel, transmitter coupled with the interface to transmit one or more data streams via the interface, and a processing element, the processing element to receive one or more data streams for transmission. Upon receiving multiple data streams for transmission of a first type of data, including a first data stream and a second data stream for transmission of the first type of data, the processing element is to select a first preamble for the first data stream and a second preamble for the second data stream, where the first preamble is distinguishable from the second preamble.

33 Claims, 12 Drawing Sheets

(56) References Cited

U.S. PATENT DOCUMENTS

| | | | |
|---|---|---|---|
| 5,442,400 A * | 8/1995 | Sun et al. | 375/240.15 |
| 5,541,662 A | 7/1996 | Adams et al. | |
| 6,141,691 A | 10/2000 | Frink et al. | |
| 6,191,822 B1 | 2/2001 | Smyers | |
| 6,914,637 B1 | 7/2005 | Wolf et al. | |
| 7,076,652 B2 | 7/2006 | Ginter et al. | |
| 7,117,003 B2 * | 10/2006 | Kayama et al. | 455/522 |
| 7,162,642 B2 | 1/2007 | Schumann et al. | |
| 7,558,537 B2 | 7/2009 | Trachewsky et al. | |
| 7,912,095 B2 | 3/2011 | Zeng et al. | |
| 2005/0144468 A1 | 6/2005 | Northcutt et al. | |
| 2006/0120523 A1 * | 6/2006 | Kurotaki | 380/201 |
| 2006/0269060 A1 * | 11/2006 | Candelore et al. | 380/239 |
| 2007/0009232 A1 | 1/2007 | Muraki et al. | |
| 2007/0056000 A1 * | 3/2007 | Pantalone et al. | 725/90 |
| 2007/0118864 A1 | 5/2007 | Champion et al. | |
| 2007/0133797 A1 | 6/2007 | Schipper et al. | |
| 2007/0162981 A1 | 7/2007 | Morioka et al. | |
| 2007/0286243 A1 | 12/2007 | Olshansky et al. | |
| 2009/0060182 A1 * | 3/2009 | Killian et al. | 380/201 |
| 2009/0168812 A1 | 7/2009 | Crookes et al. | |
| 2009/0248924 A1 | 10/2009 | Melin | |
| 2009/0316889 A1 | 12/2009 | MacDonald et al. | |
| 2010/0027604 A1 | 2/2010 | Vaidyanathan et al. | |
| 2010/0118927 A1 | 5/2010 | Ichimura et al. | |
| 2010/0287609 A1 | 11/2010 | Gonzalez et al. | |
| 2011/0088056 A1 * | 4/2011 | Ansari | 725/31 |
| 2011/0119709 A1 * | 5/2011 | Kim et al. | 725/39 |
| 2011/0134862 A1 * | 6/2011 | Huang et al. | 370/329 |
| 2011/0149032 A1 * | 6/2011 | Choi et al. | 348/43 |
| 2011/0211639 A1 | 9/2011 | Jones | |
| 2012/0020475 A1 * | 1/2012 | Altmann | 380/42 |
| 2012/0076296 A1 * | 3/2012 | Graunke | 380/205 |
| 2013/0089202 A1 | 4/2013 | Altmann | |

FOREIGN PATENT DOCUMENTS

| | | |
|---|---|---|
| KR | 10-2001-0062821 | 7/2001 |
| KR | 10-2012-0069795 | 6/2012 |

OTHER PUBLICATIONS

"High-bandwidth Digital Content Protection System Interface Independent Adaptation Specification Revision 2.0," Digital Content Protection LLC, Oct. 23, 2008.

International Search Report and Written Opinion of the International Searching Authority dated Jan. 31, 2013, in International Patent Application No. PCT/US2012/050334, 7 pages.

International Search Report dated Feb. 9, 2012, in International Patent Application No. PCT/US2011/044518, 3 pages.

Written Opinion of the International Searching Authority completed Jan. 20, 2012, in International Patent Application No. PCT/US2011/044518, 3 pages.

"CEA Standard, a DTV Profile for Uncompressed High Speed Digital Interfaces, CEA-861-D," Consumer Electronics Association, Jul. 2006, 176 pages.

International Search Report and Written Opinion of the International Searching Authority dated Nov. 22, 2013, in International Patent Application No. PCT/US2013/051538, 13 pages.

* cited by examiner

IDENTIFICATION AND HANDLING OF DATA STREAMS USING CODED PREAMBLES

TECHNICAL FIELD

Embodiments of the invention generally relate to the field of data transmission, and, more particularly, to identification and handling of data streams using coded preambles.

BACKGROUND

In the transmission of signals between devices or elements, such as the transmission of audio-visual data streams, certain technologies may require the transmission of multiple different types of data streams. For example, consumer electronics and other systems may transmit and receive one or more video streams and one or more other data streams within a single encoded interconnect.

In such communications, a receiving side of the connection is generally required to be able to distinguish between multiple video content streams, and between multiple data content streams, in order to properly render the various content streams in a useable form, such as for displayed video, rendered audio, or other purposes.

Conventional systems may utilize specific packets, such as InfoFrames defined in CEA-861 and standards such as HDMI™ (High Definition Multimedia Interface) and MHL™ (Mobile High-definition Link), to identify video content streams and data content streams. Further, standards such as HDMI and MHL have further included coded characters such are guard bands and preambles preceding or following video content or data content to distinguish between such types of content.

BRIEF DESCRIPTION OF THE DRAWINGS

Embodiments of the invention are illustrated by way of example, and not by way of limitation, in the figures of the accompanying drawings in which like reference numerals refer to similar elements.

SUMMARY

Figure 1:
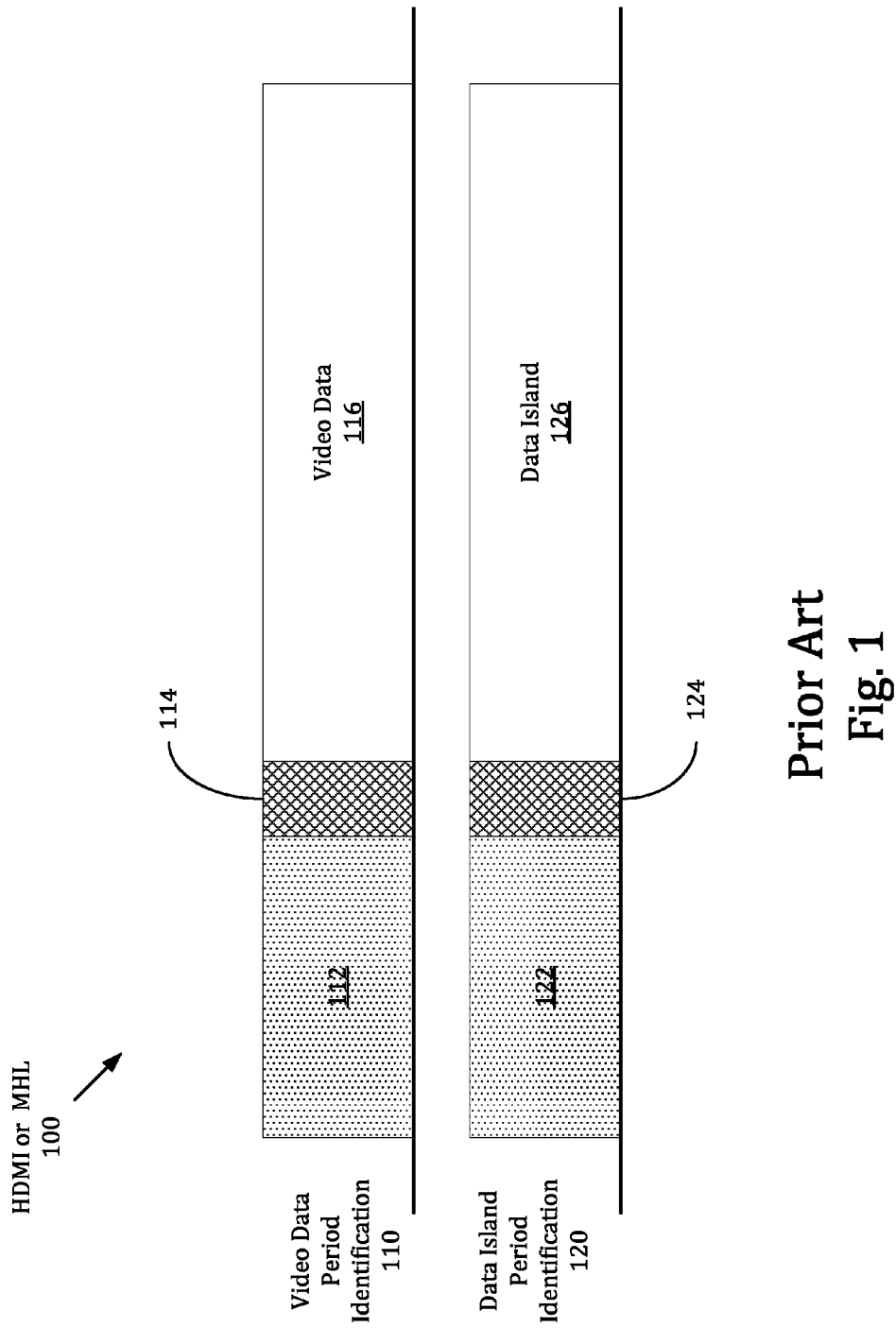
FIG. 1 illustrates data streams in a conventional system.

Embodiments of the invention are generally directed to identification and handling of data streams using coded preambles.

In a first aspect of the invention, an embodiment of an apparatus includes an interface with a communication channel, transmitter coupled with the interface to transmit one or more data streams via the interface, and a processing element, the processing element to receive one or more data streams for transmission. Upon receiving multiple data streams for transmission of a first type of data, including a first data stream and a second data stream for transmission of the first type of data, the processing element is to select a first preamble for the first data stream and a second preamble for the second data stream, where the first preamble is distinguishable from the second preamble.

In a second aspect of the invention, an apparatus includes an interface with a communication channel, and a receiver coupled with the interface to receive a plurality of data streams via the interface, the plurality of data streams of a first type, each of the plurality of data streams of the first type having a different preamble, including a first data stream having a first preamble and a second data stream having a second preamble, the first and second data streams carrying a first type of data. The receiver is to determine the existence of the plurality of data streams of the first type based on detection of the first and second preambles, and to handle each of the plurality of data streams according to the preamble for each data stream, the first data stream being handled in a first manner based on the first preamble and the second data stream being handled in a second manner based on the second preamble.

DETAILED DESCRIPTION

Embodiments of the invention are generally directed to identification and handling of data streams using coded preambles.

As used here:

"Mobile device" means a telephone (such as a smartphone), laptop computer, handheld computer, tablet computer, mobile Internet device (MID), or other mobile electronic device.

In some embodiments, a method, apparatus, or system provides unique coded preambles for each of a plurality of data streams of a type, such as a plurality of video content data streams or audio content data streams, for transmission via a single transmission channel. In some embodiments, a method, apparatus, or system utilizes unique coded preambles for each of a plurality of data streams to detect the existence of a plurality of data streams of a type and to identify each of the plurality of data streams, where each of the data streams may be handled or processes differently based on the coded preambles. In some embodiments, the preambles may include preambles that are not defined in a particular interface standard, such as HDMI or MHL.

Conventional approaches to handling data streams in a system have certain limitations. First, the approaches have no means of distinguishing among various video content streams or various data streams of a type because such approaches only address interconnects that carry a single video stream and a single data stream. Second, the approaches do not mark parts of a video stream, but rather send the InfoFrame only once per frame. Third, if a video content frame is encrypted, such as encryption with HDCP (High-bandwidth Digital Content Protection), then such encryption may prevent the identification of individual data streams.

In some embodiments, a method, apparatus, or system provides for identification and handling of a plurality of data streams utilizing preamble coding. In an example, a 3D (three-dimensional) video may include a left-eye (left channel) sub-frame and a right-eye (right channel) sub-frame. In some embodiments, a method, apparatus, or system utilizes preamble encoding to code the left-eye sub-frame and right-eye sub-frame differently, where the characters of the preamble are unaffected by encryption or decryption. In some embodiments, the preamble encoding is used to provide information regarding the transmission of 3D data, and to separate the data (left-eye sub-frames and right-eye sub-frames) for processing. In some embodiments, a downstream device or system may utilize the coding to recognize the video mode (3D video, rather than 2D video) when the sole difference between 2D and 3D data is the preamble encoding, and then to provide proper processing of each data stream.

In some embodiments, a method, apparatus, or system that is transmitting a first stream of data, such as a main pixel stream, is operable to transmit a smaller second stream of data (such as a secondary pixel content stream) in unused space of the main pixel stream, wherein the method, apparatus, or system operates to encode the preamble of the smaller stream differently from the preamble(s) in the main pixel stream. In some embodiments, a method, apparatus, or system, such as a downstream receiving device, provides for separating the combined streams, utilizing the preamble for each data stream both to recognize the existence of the multiple streams and to distinguish the streams from each other. In some embodiments, the main pixel stream (or another pixel stream) may be rendered visually and the secondary pixel stream may be optionally rendered onto the screen by user selection at the downstream receiving device. In this example, the main pixel stream may be encrypted (such as encryption using HDCP) and the secondary pixel stream may be unencrypted, with preamble for each being unencrypted.

In some embodiments, if a single data stream of a first type is transmitted, such data stream is assigned a particular first preamble. In some embodiments, if multiple data streams are transmitted, then the first preamble is assigned to a first data stream and a second preamble is assigned to the second data stream of the first type. In this manner, a transmitting device may utilize the second preamble to notify a receiving device of the existence of multiple data streams of the first type. A type of data may include related data elements. For example, a video stream, such as an HDMI or MHL video stream, may include necessary AVI (Auxiliary Video Information) InfoFrame packets or similar element to identify the type of data in addition to the video data packets. In another example, an audio stream, such as an HDMI or MHL audio stream, may include audio clock recovery data packet in addition to audio data packets. A preamble may include additional data, such as one or more symbols for an error correction mechanism, such as a parity bit or other error correction symbol.

Further, in some embodiments, the first preamble may be utilized both with a single data stream and with multiple data streams, where the first preamble may convey a first meaning when attached to a single data stream and a second meaning when attached to a first data stream of a plurality of data streams. In other embodiments, the first preamble may be utilized only in circumstances in which there is a single data stream, and other preambles (such as second preamble and a third preamble) may be utilized in circumstances in which a plurality of data streams of a particular type are transmitted together.

FIG. 1 illustrates data streams in a conventional system. In this illustration, data for transmission, which may include, for example, HDMI or MHL data 100, includes multiple data streams that are communicated via a single interface. In an example, the data may include video data and data such as data islands (where data island data includes audio and auxiliary data, and occurs during the horizontal and vertical blanking intervals).

In the transmission of such data, each video data stream includes a video data period identification 110 including a certain video data header 112, following by a guard band 114 and the video data 116. Similarly, each data island stream includes a data island period identification 120 including a certain data island header 122, following by a guard band 124 and the data island 126.

However, the data structure provided in FIG. 1 does not allow for the detection of the existence of multiple data streams of a type, or for distinguishing between each of the data streams. For example, if a communication channel is utilized to transfer multiple video data streams including a first video data stream, the video data header 112 will identify the first video data stream as video data, but will not identify the particular stream, or distinguish such video data stream from a second video data stream that is communicated with the first video data stream. Further, the transmission will not provide any notice that multiple data streams of any type are present in a transmission.

Figure 2:
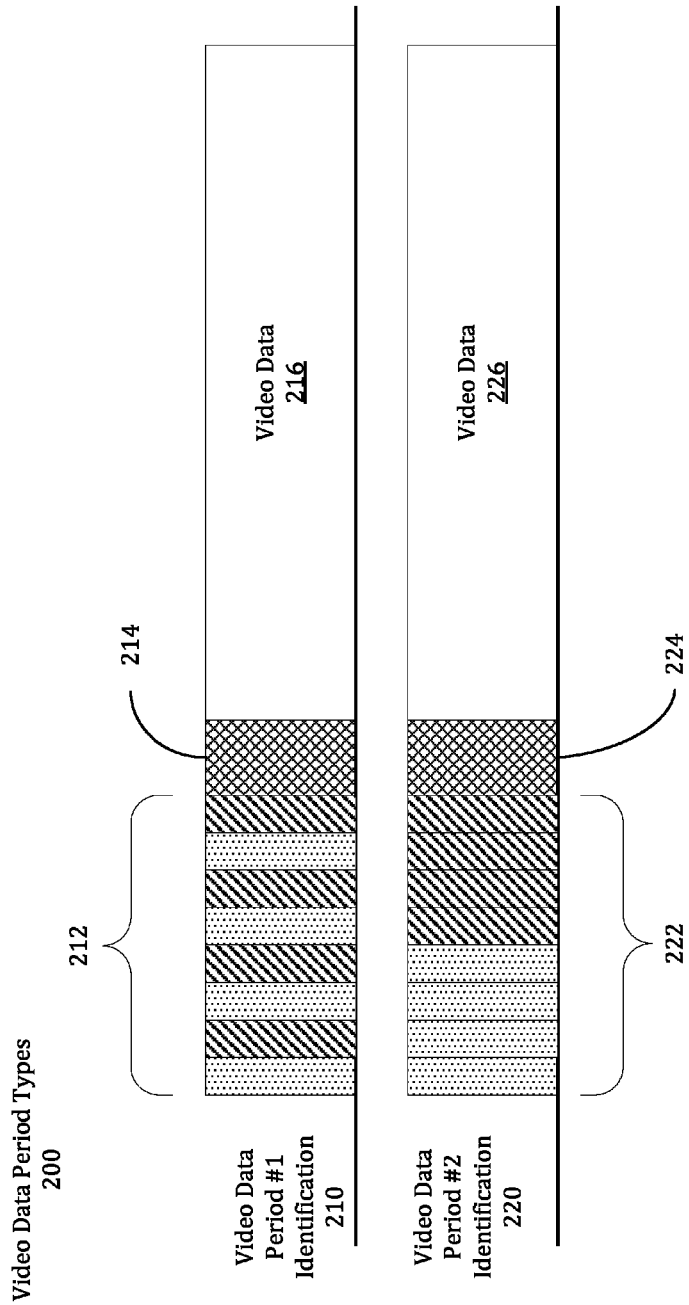
FIG. 2 illustrates video data stream types to be transmitted and received in an embodiment of an apparatus, system, or method.

FIG. 2 illustrates video data stream types to be transmitted and received in an embodiment of an apparatus, system, or method. In this illustration, data for transmission includes multiple video data period types 200. As illustrated, the video data may include data for a first video data period and a second video data period, and thus multiple data streams for a type of data, the type of data being video data in this example.

In some embodiments, in the transmission of such data, in contrast to providing a single preamble coding for video data, each different video data stream includes a video data period identification, where a first video data period identification 210 includes a first video data header 212, which is followed by a guard band 214 and the video data 216. Further, a second video data period identification 220 includes a second video data header 222, which is followed by a guard band 224 and the video data 226. While FIG. 2 illustrates two data header identifications, embodiments are not limited to these two preambles, and may include any number of different preambles to separate different video data streams, where the number of preambles is only limited by the number of different values that can be generated using the data bits that are available.

In some embodiments, the data structure provided in FIG. 2 allows for the detection of the existence of multiple data streams of a certain type and for the identification of the individual data streams, such as distinguishing a first video data stream from a second video data stream, where the first video data stream and the second video data stream may be communicated together over a single channel. In some embodiments, a transmitting device chooses the preamble for each data stream to identify the data within such data stream and to handle the data accordingly. For example, the transmitting device may choose a particular first preamble for each left-eye sub-frame and a particular second preamble for each right-eye sub-frame.

Figure 3:
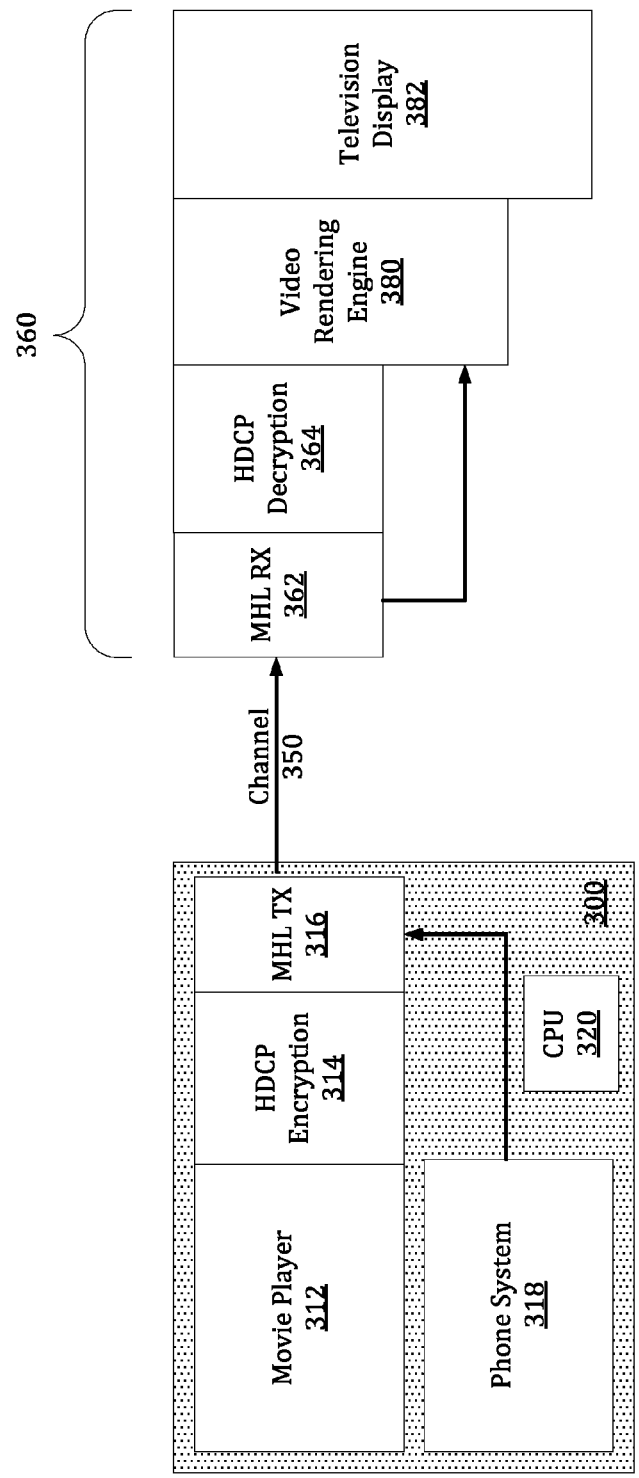
FIG. 3 illustrates embodiments of apparatuses or systems for transmission and reception of data streams.

FIG. 3 illustrates embodiments of apparatuses or systems for transmission and reception of data streams. In this illustration, a transmitting apparatus or system, such as a mobile device 300, is coupled with a receiving apparatus or system, such as a television 360, via a communication channel 350, such as an MHL cable connection. In some embodiments, the mobile device 300 includes a movie player 312 providing video data, where such data is encrypted by an HDCP encryption module or element 314 and provided to an MHL transmitter 316 for transmission in a main video stream via the channel 350. At the receiving television 360, the encrypted movie data in the main video stream is received by an MHL receiver 362, and decrypted by an HDCP decryption module or element 364. The decrypted movie data is provided to a video rendering engine 380 and provided to a display 382 for viewing. While the elements of illustrated apparatuses or systems in the figures, such as television apparatus or system 360 in FIG. 3, may be illustrated together or separately, the elements of each such apparatus or system may or may not be contained in a single unit.

In this illustration, a phone call or message may arrive at a phone system 318 of the mobile device 300. In some embodiments, a CPU 320 or other processing element of the mobile device is to create a secondary video stream, and to merge the secondary video stream into unused space of the main stream, where the secondary video stream is not encrypted. The secondary video stream may, for example, include caller ID information, a text message, or a voice to text data stream. In some embodiments, the CPU marks the secondary video stream with one or more distinct preamble values, and the mobile device transmits the merged video streams. In some embodiments, one or more preamble values are values that are not defined in an existing standard or protocol, such as HDMI or MHL. In some embodiments, the downstream television 360 is capable of detecting the new secondary video stream by checking only the preambles of received data. In some embodiments, the MHL receiver 362 detects the secondary video stream without decryption of received data, and redirects the secondary video stream to the video rendering engine 380. The television 382 may, for example, prompt a viewer that a new telephone data stream has arrived. In some embodiments, the viewer may choose whether to see or not view the new stream. If selected, the secondary stream may be shown on the display 382, such as in a small window (picture-in-picture), along the bottom (such as in a streaming data box), in a 3D overlay (on a 3D rendering TV), or in another manner.

Figure 4:
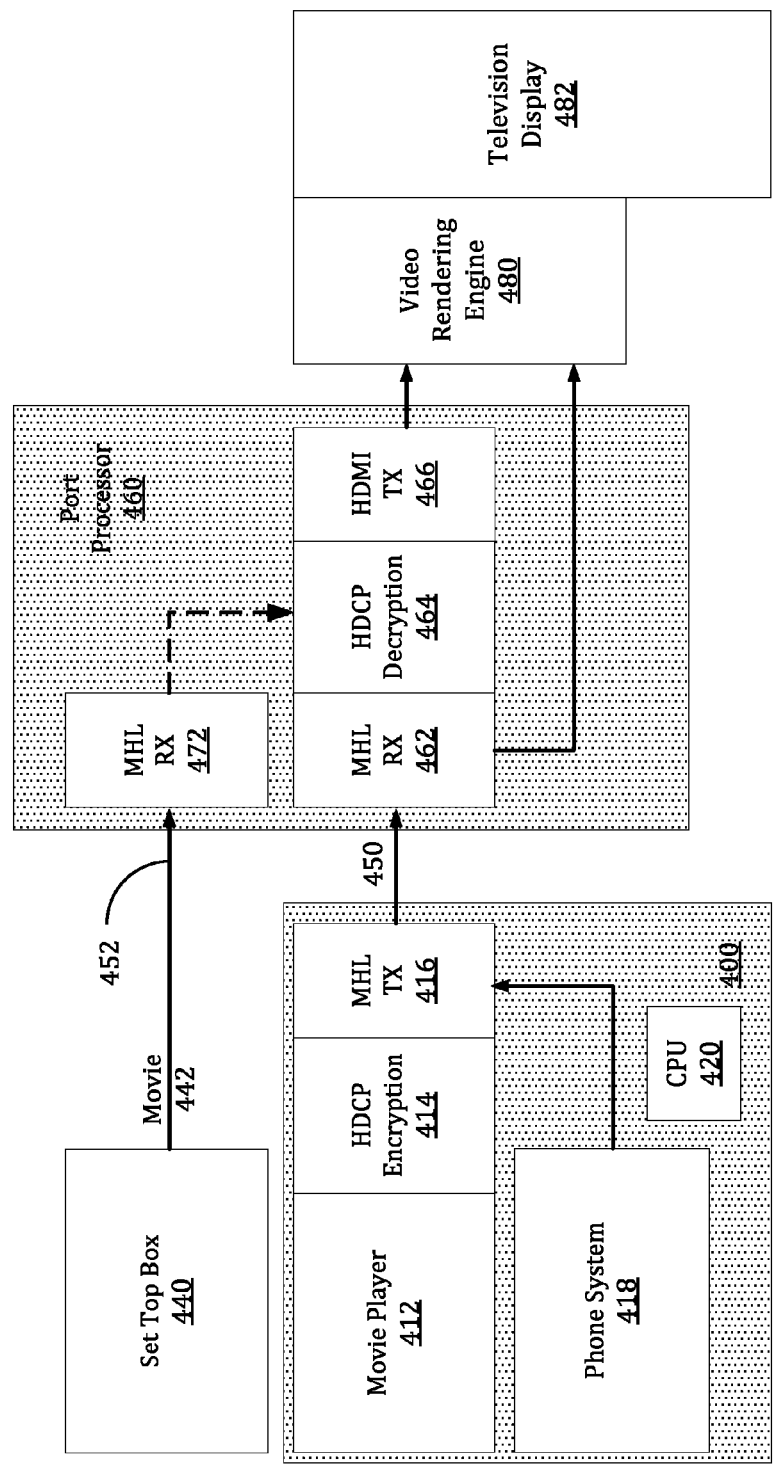
FIG. 4 illustrates embodiments of apparatuses or systems for transmission and reception of data streams, including a port processor to receive and handle multiple data streams.

FIG. 4 illustrates embodiments of apparatuses or systems for transmission and reception of data streams, including a port processor to receive and handle multiple data streams. In some embodiments, a receiving apparatus or system may include a port processor, where the port processor may, for example, include multiple input ports and a single HDCP decryption engine.

In this illustration, a transmitting apparatus or system, such as a mobile device 400, is coupled with a receiving apparatus or system, such as a port processor 460, via a first communication channel 450 (a first port of the port processor), such as an MHL cable connection. In some embodiments, the mobile device 400 includes a movie player 412 providing video data, where such data is encrypted by an HDCP encryption module or element 414 and provided to an MHL transmitter 416 for transmission in a main video stream via the first channel 450. At the receiving port processor 460, the encrypted movie data in the main video stream is received by an MHL receiver 462, and decrypted by an HDCP decryption module or element 464, which may be the sole decryption module or element of the port processor. In some embodiments, the decrypted movie data may be provided to an HDMI transmitter 466 for transmission to a video rendering engine 480 and provided to a television display 482 for viewing.

In this illustration, the port processor 460 may further be coupled to one or more other source devices, including, for example a second source device being a set top box 440 that may be receiving video data from a cable, satellite, WiMax Internet provider, or other source, where the set top box 440 may provide movie data 442 via a second channel 452 (a second MHL compatible channel in this illustration, received at a second port of the port processor) to be received by a second MHL receiver 472. The second MHL receiver 472 may provide the data to the HDCP decryption module or element 464, which then may again provide the decrypted data to the video rendering engine 480 for display on the television display 482.

In this illustration, a phone call or message may arrive at a phone system 418 of the mobile device 400. In some embodiments, a CPU 420 or other processing element of the mobile device 400 is to create a secondary video stream, and to merge the secondary video stream into unused space of the main stream from the mobile device, where the secondary video stream is not encrypted. In some embodiments, the CPU 416 marks the secondary video stream with one or more distinct preamble values, and the mobile device transmits the merged video streams. In some embodiments, the port processor 460 is capable of detecting the new secondary video stream by checking only the preambles of received data. In some embodiments, the MHL receiver 462 detects the presence of the secondary video stream without decryption of received data, recognizes the nature of the secondary video stream, and redirects the secondary video stream to the video rendering engine 480 for optional display by the television display 482, which may, for example, be combined with any active display. In some embodiments, a user may be viewing the content received at one port (such as the second port for the second channel 452) of the port processor, which is actively decrypted by that single engine. If an unencrypted stream (such as the data from the phone system 418) arrives at a different port (the first port for the first channel 450), even though such stream is combined or mixed inside an encrypted main stream (such as from the movie player 412)—this unencrypted video stream (or audio, or both) may be combined in the video rendering engine 480 (or audio rendering engine) without being required to actively decrypt the main stream arriving at the first port with the unencrypted stream.

Figure 5:
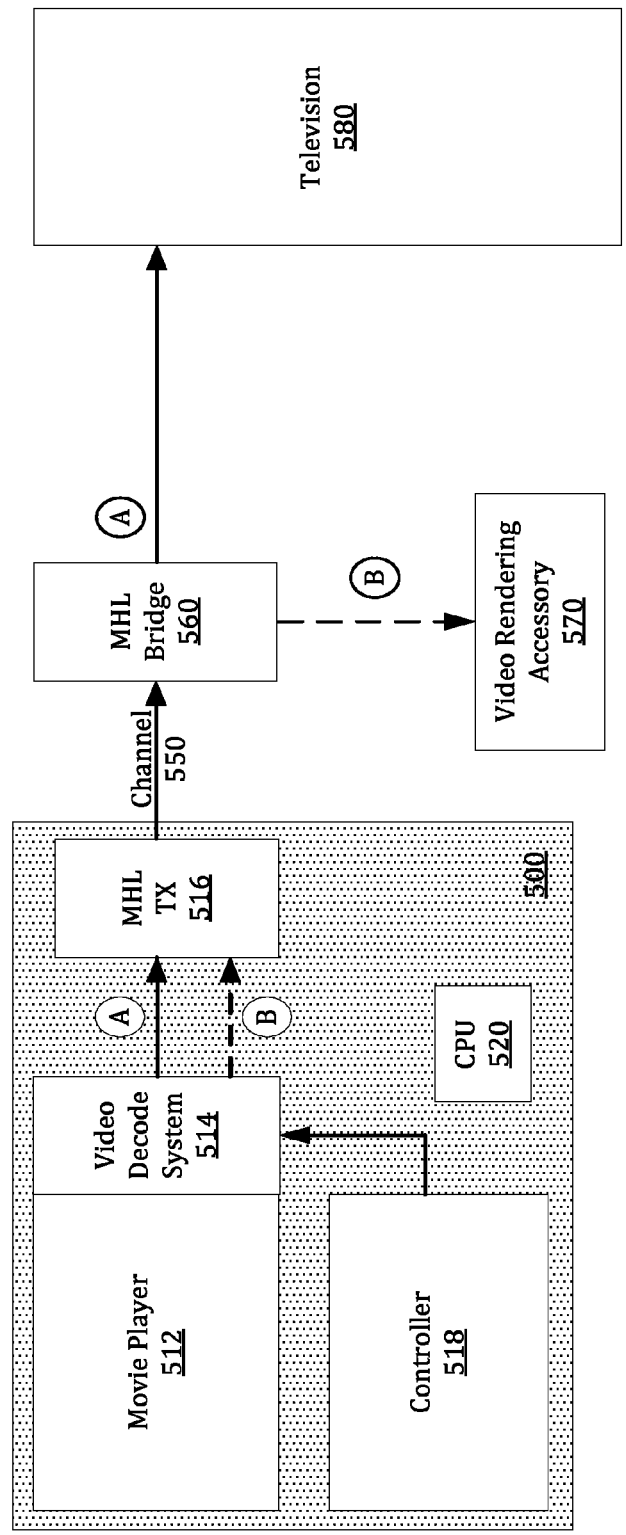
FIG. 5 illustrates embodiments of apparatuses or systems for transmission and reception of multiple data streams, including a bridge device to separate data streams.

FIG. 5 illustrates embodiments of apparatuses or systems for transmission and reception of multiple data streams, including a bridge device to separate data streams. In some embodiments, a television 580 may receive content from source device 500 (such as an HDMI or MHL device). In some embodiments, if a user selects closed captioning for a video program, a source device 500 may be requested to send the captioning as "closed captions", not merged into the main video stream (which would be referred to as "open captions"). These closed captions are enabled and disabled, and rendered at the television endpoint. In some embodiments, the source device includes a movie player 512 and a video decoding system 514, and may include CPU 520. Upon instruction from a controller 518, the video decode system 514 may provide the video data A and additional closed caption video data B, where both such video data streams are presented to an MHL transmitter 516. In some embodiments, the transmitter 516 provides for marking the standard video data with a first preamble and the closed caption video data with a second preamble. In some embodiments, the transmitter 516 provides for merging of the data streams, and transmission of the merged data streams via a single channel 550.

In some embodiments, a bridge element 560 receives the data from the channel 550. In some embodiments, the bridge element 560 determines that multiple data streams are presented by the detection of multiple preambles, the bridge element operating to separate the movie video data from the closed caption video data. In some embodiments, the normal video stream data may be provided to the television 580 while the closed captions video data might be rendered in another apparatus external to or separate from the television, such as in a smaller video rendering accessory box 570 attached to the television 580, where such accessory box may be provided for a hearing impaired person using a normal TV that does not support the display of the captions.

In some embodiments, the source device 500 constructs and sends the closed captions as separate video lines in a transmission, where the closed caption data is provided with a unique preamble. In some embodiments, the bridge device recognizes the lines with the unique preamble, and processes such lines separately. This process allows for use of a television that, for example, is not required to be capable of rendering a large variety of character sets (international characters) for closed captioning. In this example, the source device 500 sends pixel data in a primary video stream, with the characters for the closed captions being rendered in a secondary video stream. This operation is in contrast to a conventional television that receives closed captions, and encodes the characters as hexadecimal characters from a character set, thus requiring that the television recognize the characters and draw them for display.

Figure 6:
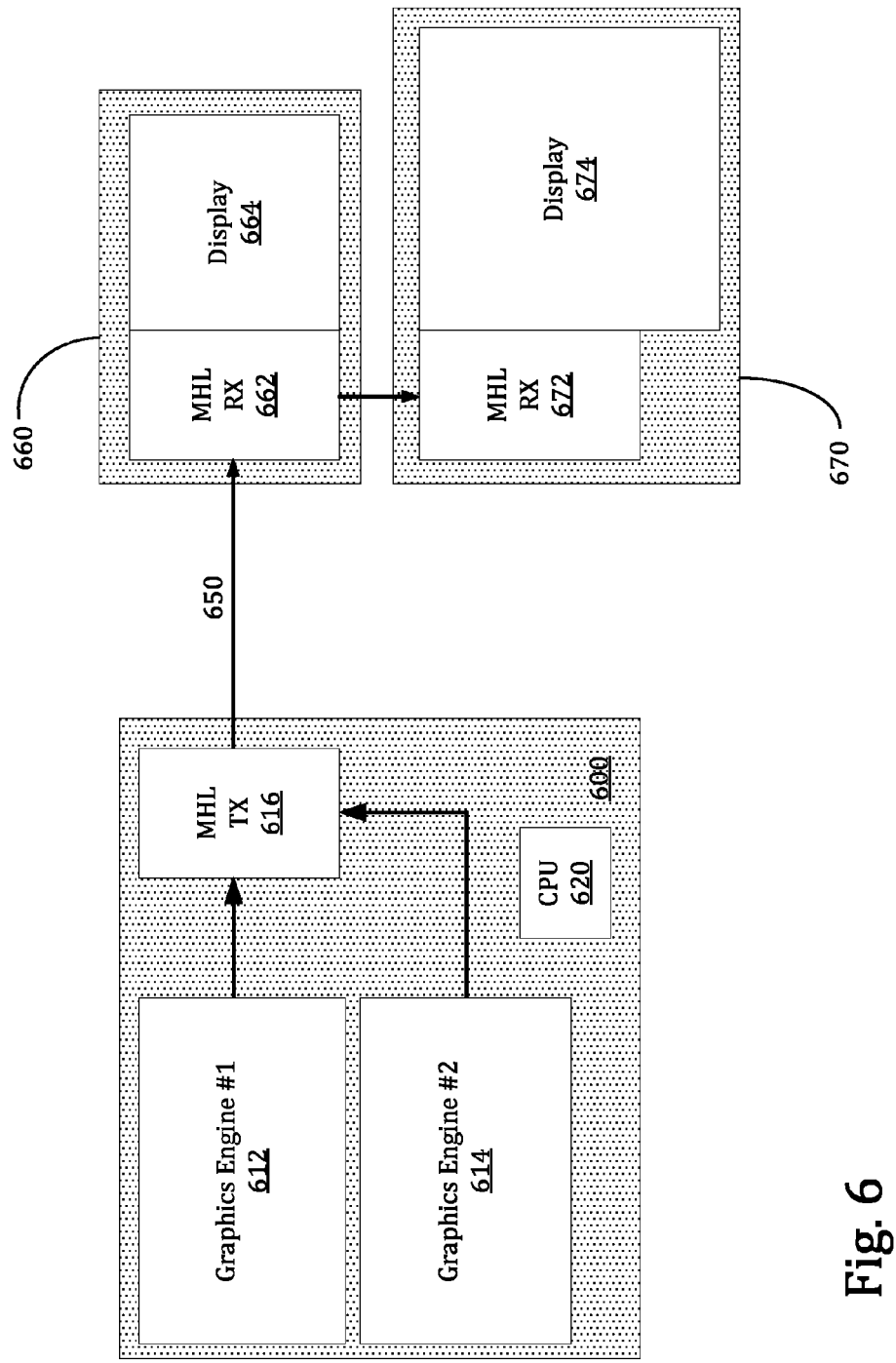
FIG. 6 illustrates embodiments of apparatuses or systems for transmission and reception of multiple data streams.

FIG. 6 illustrates embodiments of apparatuses or systems for transmission and reception of multiple data streams. In this illustration, a source device 600, such as a laptop computer, may operate to output two complete data streams, such as HDMI or MHL streams. In some embodiments, the source device may include a first graphics engine (graphics engine #1) 612 to generate a first data stream and a second graphics engine (graphics engine #2) 614 to generate a second data stream, and CPU 620. In some embodiments, the computer may further include an MHL transmitter 616 for the transmission of the data stream generated by the first graphics engine and the second graphics engine.

In some embodiments, each of the data streams is complete with video data periods, data islands, InfoFrames, and other such elements. In some embodiments, the preambles of one of the data streams—in all of its data periods—are marked with a first preamble value, and the preamble of all data periods in the second stream are marked with a second preamble value. While this example is directed to two streams, embodiments are not limited to any particular number of streams, and may apply to system with two or more streams. Because each such stream carries its own AVI InfoFrame and its own audio data packets, the video mode and audio mode of one stream does not need to match the video mode and audio mode of the other stream.

In some embodiments, the multiple streams of a system are provided to separate systems. For example, an apparatus or system, such as a laptop computer, may be connected to two daisy-chained MHL displays, such as a first display apparatus 660 containing MHL receiver 662 and display 664 and a second display apparatus 670 containing MHL receiver 672 and display 674, where the second display apparatus is external to or separate from the first display apparatus. In this example, the displays may be of different types, where, for example the first display apparatus 660 may be an XGA (Extended Graphics Array) display and the second display apparatus 670 may be a 720p (1280×720 resolution) display. In some embodiments, the laptop 600 may choose a link clock with a sufficiently high frequency to send both streams via a channel 650.

In some embodiments, the receiving downstream device, in this case first display apparatus 660, receives the two streams, and, based on the preambles of the data, the receiver 662 of the first display apparatus 660 determines that there are a plurality of streams, and handles each stream according to the preamble for the stream. In an example, the received streams may include a first stream that is compatible with the first display device 660 and a second stream that is compatible with the second display device 670. In this example, the MHL receiver 662 of the first display apparatus provides the first stream for rendering on display 664, and separates the second stream for transmission to the second display apparatus 670, where the MHL receiver 672 of the second display apparatus receives the second stream and provides for rendering the second stream on the second display 674.

In circumstances in which there are three or more streams, the devices may be further daisy-chained, such that the receiver 662 of first display apparatus receives first, second, and third streams, retains the first stream for rendering on the display 664, and directs the second and third streams to the MHL receiver 672 of the second display apparatus, which retains the second stream for rendering on the display 674, and directs the third stream to an MHL receiver of a third display apparatus (not shown) that is linked to the second display apparatus 670.

Figure 7:
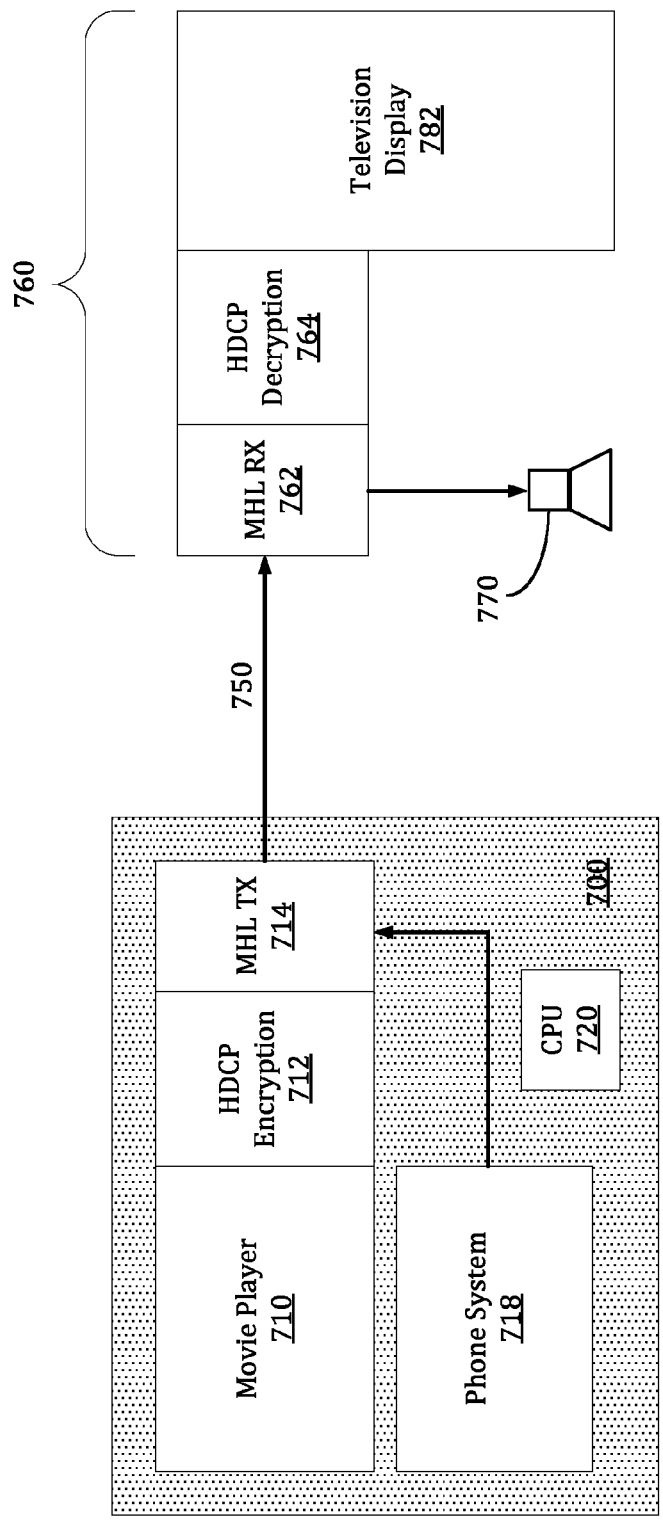
FIG. 7 illustrates embodiments of apparatuses or systems for transmission and reception of multiple data streams.

FIG. 7 illustrates embodiments of apparatuses or systems for transmission and reception of multiple data streams. In this illustration, a transmitting apparatus or system, such as a smart phone or other similar telephone 700, is coupled with a receiving apparatus or system 760, via a communication channel 750, such as an MHL cable connection. In some embodiments, the telephone 700 includes a movie player 710 providing video content data and audio content data, where such data is encrypted by an HDCP encryption module or element 712 and provided to an MHL transmitter 714 for transmission via the channel 750. At the receiving apparatus or system 760, the encrypted movie data in the main video stream is received by an MHL receiver 762, and decrypted by an HDCP decryption module or element 764. The decrypted movie data is provided to a video rendering engine 780 and provided to a display 782 for viewing, where the viewing of the movie also includes presentation of the related audio data.

In some embodiments, encrypted content, such as the HDCP encrypted movie content, may be merged with unencrypted content. For example, a content-protected movie provided by the telephone 700 may be mixed by the telephone (by or an accessory to the telephone) with an unencrypted audio stream coming from a phone call. In some embodiments, at the downstream end, the content-protected data is sent onward to the video rendering system, where the content protection may be removed, while the unprotected audio for the phone call is rendered so that the user can hear it. This operation may be utilized, for example, in a docking situation, where a docking device or system may strip the unprotected audio out of the received stream and send the protected video to the downstream device. In this example, the phone call audio may be inserted with a distinguishable preamble value to provide notice that additional audio is present in the received data and to allow for identification of the audio.

In this illustration, a phone call may arrive at the phone system 718 of the telephone 700. In some embodiments, a CPU 720 or other processing element of the mobile device is to create a secondary audio stream, and to merge the secondary audio stream into unused space of the main stream, where the secondary audio stream is not encrypted. In some embodiments, the telephone 700 may use a low sampling rate for the audio to limit the number of audio data packets, and thus allow for fitting the audio into the unused space of the transmitted stream with minimal compromise in quality because the audio is a phone call that generally is not high quality audio. In some embodiments, the CPU 720 marks the secondary audio stream with one or more distinct preamble values, and the mobile device transmits the merged data streams. In some embodiments, the downstream device or system 760 is capable of detecting the new secondary audio stream by checking only the preambles of received data. In some embodiments, the MHL receiver 762 detects the secondary audio stream without decryption of received data, and redirects the secondary audio stream to an audio device 770, the audio device 770 allowing a user to hear the telephone call on a remote speaker without interfering with the transmission and reception of the movie data.

Figure 8:
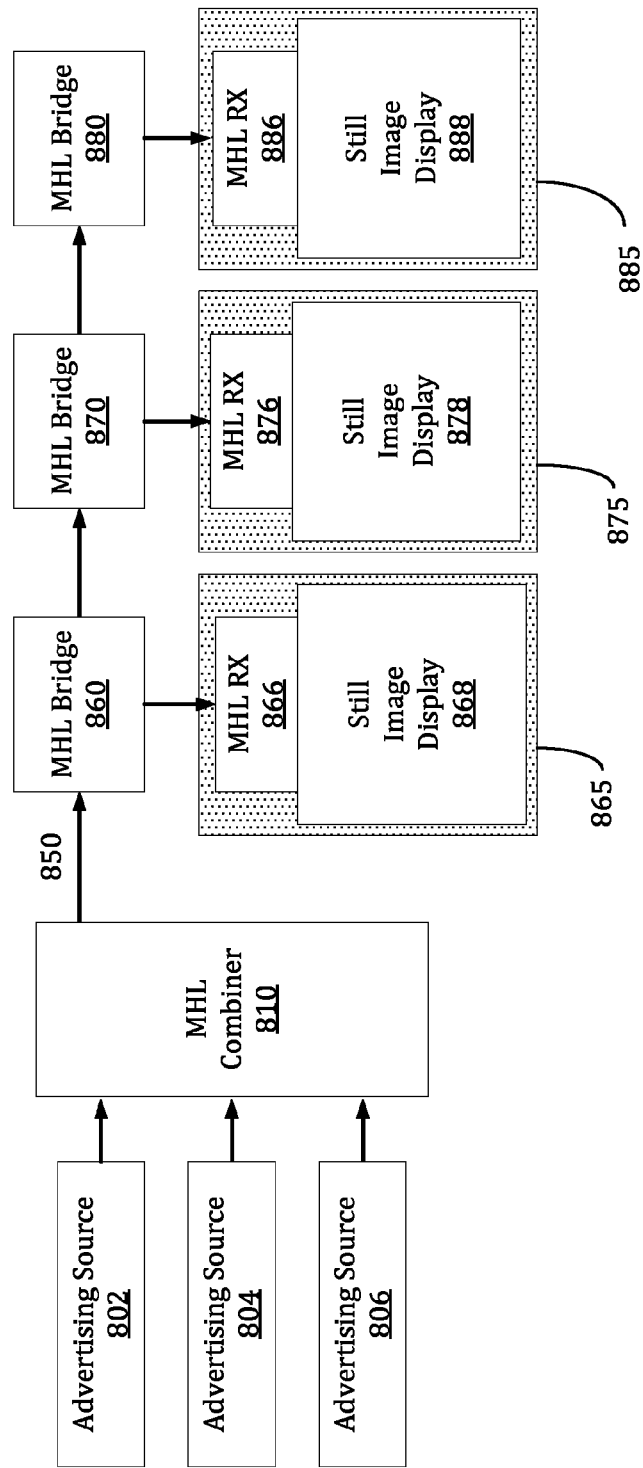
FIG. 8 illustrates an embodiment of an apparatus or system for transmission of multiple data streams.

FIG. 8 illustrates an embodiment of an apparatus or system for transmission of multiple data streams. In some embodiments, multiple images may be transmitted across a single link using a stream that combines all images together, where a transmitting element tags the data for each of the images with a unique preamble.

In this illustration, multiple content sources, such as first advertising source 802, second advertising source 804, and third advertising source 806, each provide contents, such as different advertising image from each source. While embodiments are not limited to any particular location or usage, in an example the advertisements may be utilized in a public space, such as a store, theater, restaurant, bar, or other establishment, in which a series of displays may be used for advertising at certain points in time. In some embodiments, the displays may be utilized for other purposes, such as presenting a video stream at other times. In some embodiments, the image output from each of the advertising sources may be presented to a combining element, such as MHL combiner 810, that combines the image data for the advertising sources in a signal data stream for transmission via a single connection interface 850. In some embodiments, a first MHL bridge 860 is to be coupled with the interface 850, where the first MHL bridge 860 may be connected in series (daisy-chained) with one or more other bridge devices, such as a second MHL bridge 870 coupled with the first MHL bridge and a third MHL bridge 880 coupled with the second MHL bridge 870. In some embodiments, each of the bridge devices is coupled with an endpoint, the endpoint being a device including an MHL receiver and a still image display, such as first MHL bridge 860 coupled with endpoint 865 including MHL receiver 866 and still image display 868, second MHL bridge 870 coupled with endpoint 875 including MHL receiver 876 and still image display 878, and third MHL bridge 880 coupled with endpoint 885 including MHL receiver 886 and still image display 888.

In some embodiments, only interface chips or other elements, such interface chips of MHL bridges 860, 870, and 880, and not standard video systems, such as endpoints 865, 875, and 885, are required to understand the separate preambles provided for the advertising images. In some embodiments, the interface chips that detect the multiple preambles may operate to segregate the image (or stream) that is intended for each particular endpoint, and to send the remainder on to the next downstream unit in a chain of units. In some embodiments, an interface chip may translate each unique preamble character back into a standard preamble, such as an HDMI or MHL preamble. Thus, an advertising image or stream may be provided with a preamble such that a particular bridge device detects the data image or stream, the bridge device then changing the preamble from the unique preamble back to a standard MHL preamble. If there is no encryption of the images, then the images or streams can be combined up to the bandwidth limit of the connection. In some embodiments, end devices that can "freeze" an image (using a frame buffer) may capture their own image from the interconnect, so that each image is not needed on the link at a refresh rate such as 50 or 60 frames per second. When a new image is available, the sending device may detect a change of image, and send the new image once across the shared link.

Figure 9:
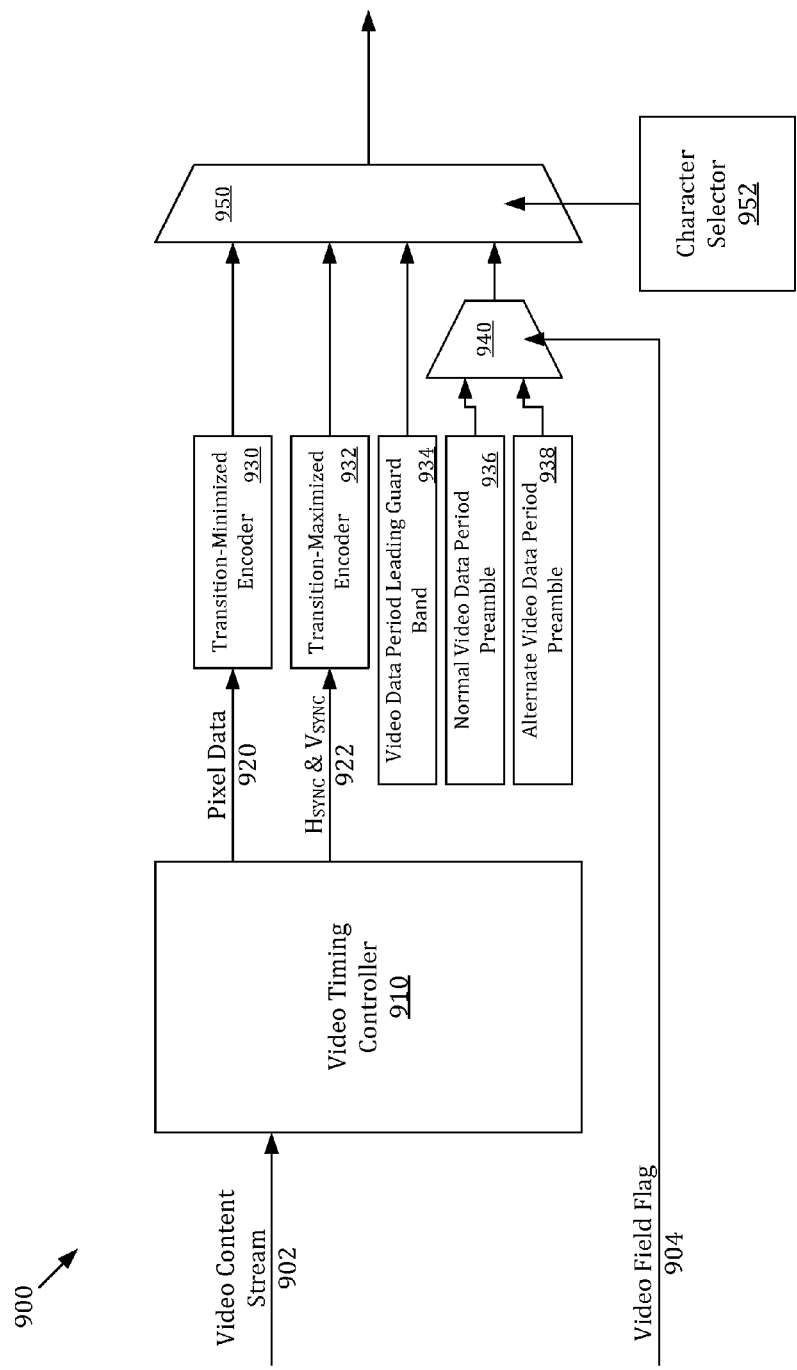
FIG. 9 is an illustration of a transmitting apparatus or system for multiple data streams.

FIG. 9 is an illustration of a transmitting apparatus or system for multiple data streams. In some embodiments, a transmitting device 900 may obtain a stream of a certain first type of data, such as a video content stream 902. However, the device 900 may obtain multiple streams of data of the first type. In some embodiments, the device 900 includes a video timing controller 910, where the controller 910 separates the data into pixel data 920 that is presented to an encoder (a transition-minimized encoder in this example) 930, and $H_{SYNC}$ and $V_{SYNC}$ signals 922 that are presented to an encoder (a transition-maximized encoder) 932, where such encoded data is presented to a multiplexer 950. The multiplexer 950 further receives a video data period lead guard band 934 and preamble, where the data elements are chosen by a character selector 952, which is utilized in constructing the data to be transmitted.

In some embodiments, the device 900 receives multiple video streams, such as a primary video stream and a secondary video stream that will be merged with the primary video stream. In some embodiments, the device 900 further includes a second multiplexer 940 that receives multiple preambles for different data streams. In this example, the preambles includes a normal video data period preamble 936, which may be utilized for a primary video stream, and an alternate video data period preamble 938, which may be utilized for a secondary video stream. In some embodiments, the device 900 generates or receives a video field flag 904, where the flag is received at the second multiplexer 940 to choose the appropriate preamble for each stream of data. In this example, the device 900 may utilize the normal preamble 936 for all video data if there is a single video stream. The device may then mark data of a second video stream with the alternate preamble 938. In this matter, the device 900 informs a receiving device that multiple data streams are being sent through the use of the alternate preamble, and further identifies each video data stream for separate handling or processing through the use of the multiple preambles.

Figure 10:
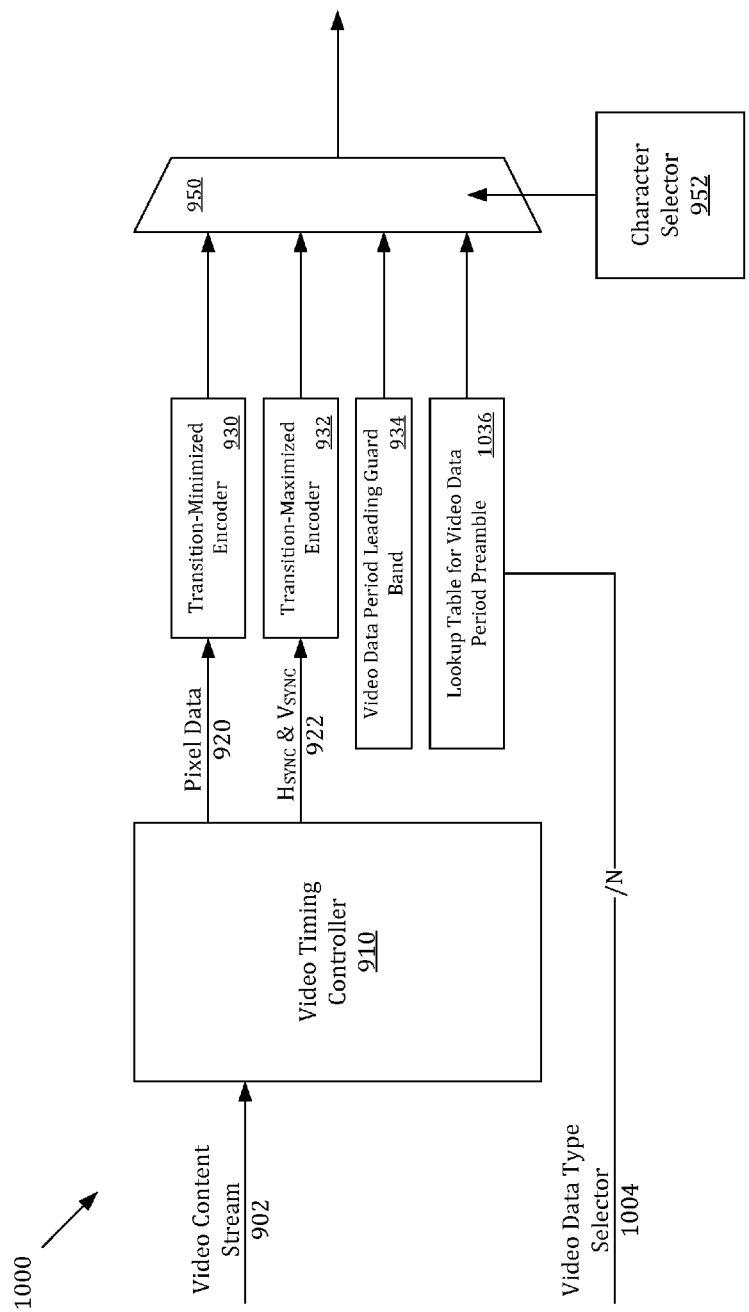
FIG. 10 is an illustration of a transmitting apparatus or system for multiple data streams using a lookup table.

FIG. 10 is an illustration of a transmitting apparatus or system for multiple data streams using a lookup table. In this illustration, a device 1000 may include the elements describe above with regard to FIG. 9, with such device 1000 including a lookup table 1036 for video data period preambles, rather than the second multiplexer 940 illustrated in FIG. 9. In some embodiments, the device 1000 receives or generates a video data type selector 1004, where the selector may include N bits of data to allow for choosing a preamble from up to $2^N$ preambles.

Figure 11:
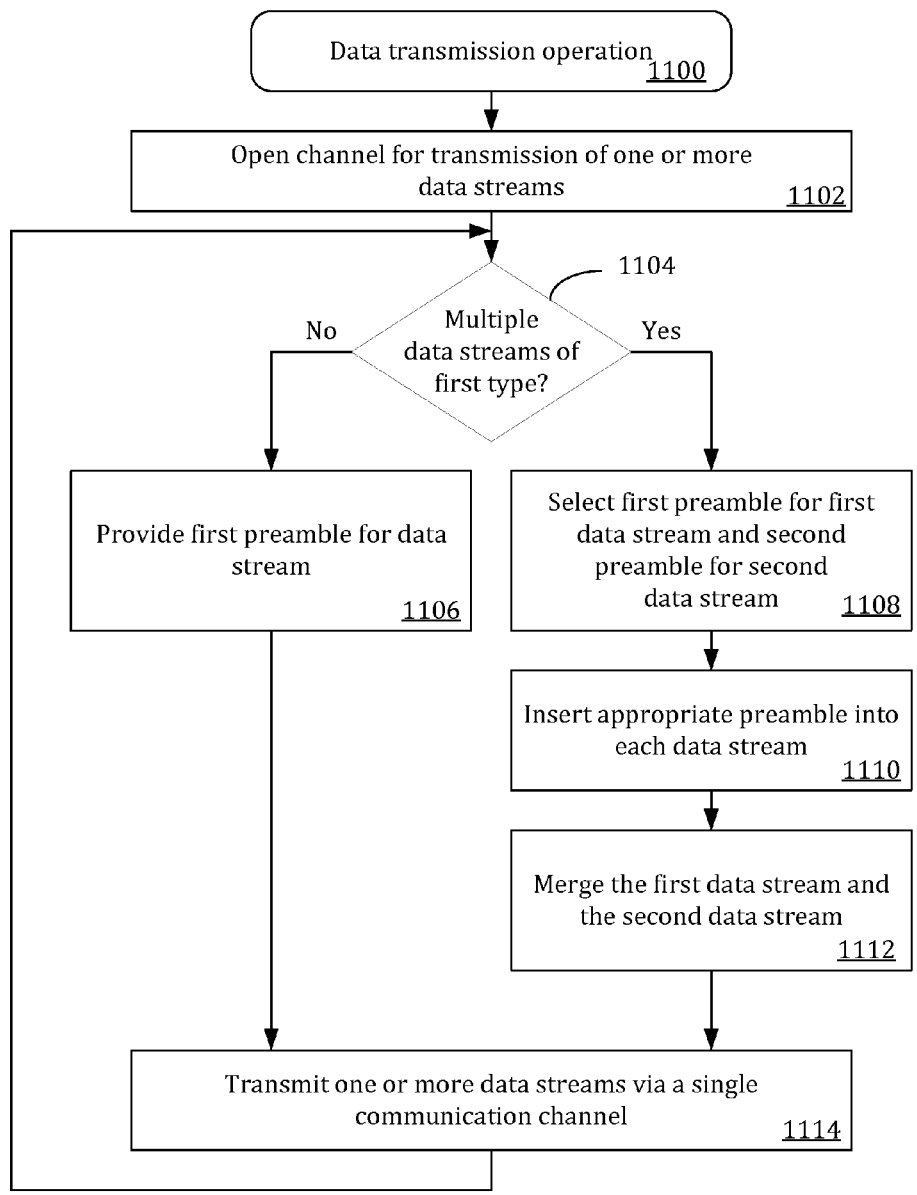
FIG. 11 is a flowchart to illustrate an embodiment of a data transmission operation.

FIG. 11 is a flowchart to illustrate an embodiment of a data transmission operation. In some embodiments, a transmission operation 1100 may commence with opening a channel for transmission of one or more data streams 1102. In some embodiments, if there are not multiple data streams of a first type (thus a single data stream of the first type) 1104, then a first preamble may provided for the data stream of the first type 1106. The first preamble may be, for example, a standard preamble for a particular interface or communication standard. In some embodiments, if there are multiple data streams of the first type 1104, including a first data stream and a second data stream of the first type, then an appropriate preamble is selected for each data stream, such as a first preamble being selected for the first data stream and a second preamble being selected for the second data stream 1108.

In some embodiments, the appropriate preamble is inserted into each data stream 1110. In some embodiments, the data streams are merged for transmission, such as the merging of the first data stream with the second data stream 1112, which may include inserting data of the second data stream into empty portions of the first data stream. In some embodiments, the one or more data streams are transmitted via a single communication channel 1114. In some embodiments, notification regarding the transmission of multiple data streams and identification of each data stream is made by the inclusion of the multiple preambles for the data streams.

Figure 12:
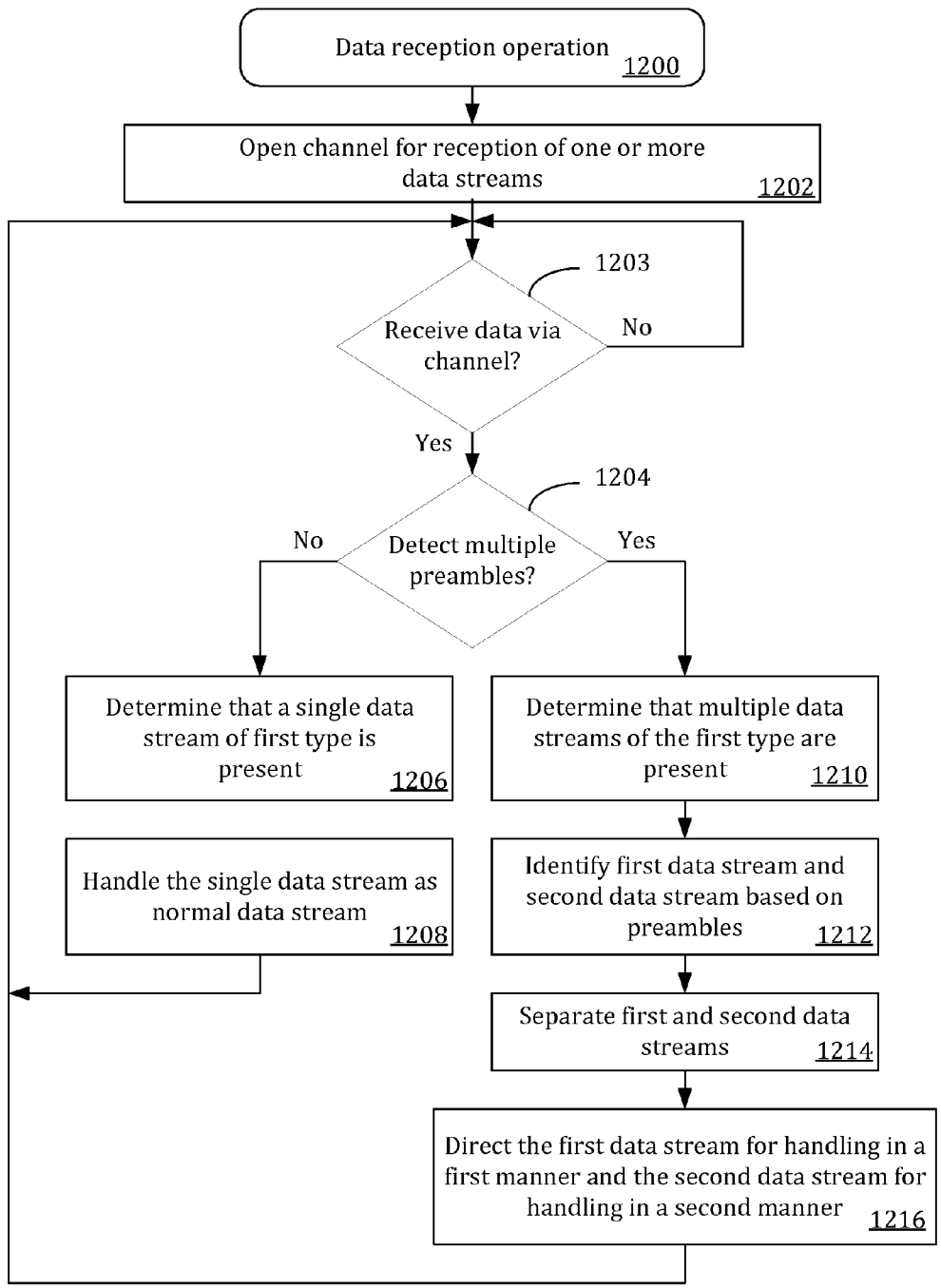
FIG. 12 is a flowchart to illustrate an embodiment of a data reception operation.

FIG. 12 is a flowchart to illustrate an embodiment of a data reception operation. In some embodiments, a data reception operation 1200 may commence with opening a channel for reception of one or more data streams 1202. In some embodiments, if data is received via channel (where the channel may be a single channel for reception of one or more data streams) 1203, there is a determination whether multiple preambles of data streams of a first type are detected 1204. The determination of the existence of multiple preambles may include, for example, the detection of a certain preamble that is only received when multiple data streams of a type are present.

In some embodiments, if there is no detection of multiple preambles 1204, then there is a determination that a single data stream of the first type is present in the received data 1206. In some embodiments, the single data stream may be handled as a normal data stream 1208, such as, for example, a primary video stream for display.

In some embodiments, if multiple preambles are detected 1204, then there is a determination that multiple data streams of the first type are present in the received data 1210. In some embodiments, the first data stream and the second data stream are identified based on the respective preamble for each data stream 1212. In some embodiments, the first data stream and the second data stream may be separated from each other 1214, where the first data stream may be directed for handling in a first manner (such as rendering as a primary video stream) and the second data stream may be directed for handling in a second manner (such as rendering as a secondary video stream) 1216.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs that are not illustrated or described. The illustrated elements or components may also be arranged in different arrangements or orders, including the reordering of any fields or the modification of field sizes.

The present invention may include various processes. The processes of the present invention may be performed by hardware components or may be embodied in computer-readable instructions, which may be used to cause a general purpose or special purpose processor or logic circuits programmed with the instructions to perform the processes. Alternatively, the processes may be performed by a combination of hardware and software.

Portions of the present invention may be provided as a computer program product, which may include a computer-readable non-transitory storage medium having stored thereon computer program instructions, which may be used to program a computer (or other electronic devices) to perform a process according to the present invention. The computer-readable storage medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/computer-readable medium suitable for storing electronic instructions. Moreover, the present invention may also be downloaded as a computer program product, wherein the program may be transferred from a remote computer to a requesting computer.

Many of the methods are described in their most basic form, but processes may be added to or deleted from any of the methods and information may be added or subtracted from any of the described messages without departing from the basic scope of the present invention. It will be apparent to those skilled in the art that many further modifications and adaptations may be made. The particular embodiments are not provided to limit the invention but to illustrate it.

If it is said that an element "A" is coupled to or with element "B," element A may be directly coupled to element B or be indirectly coupled through, for example, element C. When the specification states that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification refers to "a" or "an" element, this does not mean there is only one of the described elements.

An embodiment is an implementation or example of the invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects.

What is claimed is:

1. An apparatus comprising:
an interface with a first communication channel;
a transmitter coupled with the interface to transmit one or more data streams via the interface over the first communication channel;
a processing element, the processing element to receive one or more data streams for transmission; and
an encryption module;
wherein, for a plurality of data streams for transmission of a first type of data including a first data stream and a second data stream for transmission of the first type of data, the processing element is to:

select a first preamble to identify the first data stream and a second preamble to identify the second data stream, wherein the first preamble is distinguishable from the second preamble, the first preamble and the second preamble selected by choosing either from a plurality of preamble inputs to a multiplexer or from a plurality of preambles of a lookup table, insert the first preamble to precede the first data stream and the second preamble to precede the second data stream, and merge the first data stream and second data stream together for transmission via the first communication channel, the first data stream and second data stream being merged together, wherein the merging of the first data stream and the second data stream includes inserting the second data stream into unused space of the first data stream;

wherein the encryption module is to encrypt the first data stream, and wherein the encryption module does not encrypt the first preamble for the first data stream or the second preamble for the second data stream.

2. The apparatus of claim 1, wherein selecting the first preamble and the second preamble includes selecting a preamble for each data stream that identifies data being carried by the first data stream and the second data stream.

3. The apparatus of claim 2, wherein the apparatus utilizes the first preamble in a transmission of a single data stream of the first type.

4. The apparatus of claim 1, wherein the encryption module does not encrypt the second data stream.

5. The apparatus of claim 1, wherein the encryption module is an HDCP (High-bandwidth Digital Content Protection) compatible element.

6. The apparatus of claim 1, wherein the communication channel is compatible with HDMI™ (High Definition Multimedia Interface) or MHL™ (Mobile High-definition Link).

7. The apparatus of claim 1, wherein the first type of data is one of video content data and audio content data.

8. The apparatus of claim 7, wherein the first type of data is video data, the first data stream being a first primary data stream and the second channel being a second secondary data stream.

9. The apparatus of claim 1, wherein the apparatus is a mobile device.

10. An apparatus comprising:
an interface with a first communication channel; and
a receiver coupled with the interface to receive a plurality of data streams of a first type via the interface over the first communication channel, each of the plurality of data streams of the first type having a different preamble preceding the data stream that identifies the data stream and distinguishes the data stream from the other data streams of the plurality of data streams, the plurality of data streams including a first data stream having a first preamble and a second data stream having a second preamble, the first preamble and the second preamble chosen either from a plurality of preamble inputs to a multiplexer of a transmitter or from a plurality of preambles of a lookup table of the transmitter, the first and second data streams carrying a first type of data, the first data stream and second data stream being merged together, wherein the merger of the first data stream and the second data stream includes the insertion of the second data stream into unused space of the first data stream, and wherein one or more of the plurality of data streams of the first type, including the first data stream, are encrypted and wherein the preambles of the plurality of data streams are unencrypted; and
a decryption module to decrypt the one or more encrypted data streams;
wherein the receiver is to:
determine the existence of the plurality of data streams of the first type based on detection of the first preamble and second preamble, and
handle each of the plurality of data streams according to the preamble for each data stream, the first data stream being handled in a first manner based on the first preamble and the second data stream being handled in a second manner based on the second preamble,
wherein handling the first data stream based on the first preamble includes decrypting the first data stream utilizing the decryption module.

11. The apparatus of claim 10, wherein the decryption module is an HDCP (High-bandwidth Digital Content Protection) compatible element.

12. The apparatus of claim 10, wherein the communication channel is compatible with HDMI™ (High Definition Multimedia Interface) or MHL™ (Mobile High-definition Link).

13. A system comprising:
an interface with a first communication channel; and
a receiver coupled with the interface to receive a plurality of merged data streams of a first type via the interface over the first communication channel, each of the plurality of data streams having a separate preamble preceding the data stream that identifies the data stream and distinguishes the data stream from the other data streams, the plurality of data streams including a first data stream having a first preamble and a second data stream having a second preamble, the first preamble and the second preamble chosen either from a plurality of preamble inputs to a multiplexer of a transmitter or from a plurality of preambles of a lookup table of the transmitter, the first and second data streams carrying a first type of data, the first data stream and second data stream being merged together, wherein the merger of the first data stream and the second data stream includes the insertion of the second data stream into unused space of the first data stream, and wherein one or more of the plurality of data streams of the first type, including the first data stream, are encrypted and wherein the preambles of the plurality of data streams are unencrypted;
and a decryption module for the decryption of the one or more encrypted data streams;
wherein the receiver is to:
determine the existence of the plurality of streams of the first type based on detection of the first and second preamble, and
handle each of the plurality of data streams according to the preamble for each data stream, the first data stream being directed to a first element based on the first preamble and the second data stream being directed to a second element based on the second preamble,
wherein handling the first data stream based on the first preamble includes decrypting the first data stream utilizing the decryption module.

14. The system of claim 13, wherein the receiver is a part of a port processor to receive data via one or more ports, the one or more ports including a first port for the interface.

15. The system of claim 13, wherein the first element is a television display to display the first data stream.

16. The system of claim 13, wherein the first element is a part of the system and the second element is external to the system.

17. The system of claim 16, wherein the second element is a second system including a second receiver.

18. A method comprising:
obtaining a plurality of data streams to be transmitted via a single interconnect over a first communication channel, the plurality of data streams including a first data stream and a second data stream, the first data stream and the second data stream each containing a first type of data;
choosing a first preamble to identify the first data stream and a second preamble to identify the second data stream, the first preamble and the second preamble chosen either from a plurality of preamble inputs to a multiplexer or from a plurality of preambles of a lookup table, the first preamble and the second preamble each having a predetermined number of clock periods, the first and second preambles uniquely identifying the first data stream and the second data stream among data streams of the first type for transmission, wherein the first preamble is distinguishable from the second preamble;
inserting the first preamble to precede the first data stream and the second preamble to precede the second data stream;
merging the first data stream and the second data stream together for transmission, wherein merging the first data stream and the second data stream includes inserting the second data stream into unused space of the first data stream; and
transmitting via the single interconnect over the first communication channel:
an element to identify the first type of data,
the first data stream, wherein the first data stream is preceded by the first preamble, the first data stream being encrypted for transmission and the first preamble being unencrypted, and
the second data stream, wherein the second data stream is preceded by the second preamble, the second preamble being unencrypted.

19. The method of claim 18, wherein the first preamble and the second preamble each include one or more symbols for an error correction mechanism.

20. A method comprising:
receiving a plurality of merged data streams via a single interconnect over a first communication channel at a receiver, wherein the merged data streams include a first data stream and a second data stream merged by the insertion of the second data stream into unused space of the first data stream, the plurality of data streams including a designation to identify a first type of data, each of the plurality of data streams of the first type being preceded by a preamble having a predetermined number of clock periods to identify each of the different data streams of the first type and to distinguish each of the data streams from each other of the plurality of data streams, the preamble for each of the data streams of the first type being unique among the plurality of data streams of the first type, the first data stream having a first preamble and the second data stream having a second preamble, the first preamble and the second preamble chosen either from a plurality of preamble inputs to a multiplexer of a transmitter or from a plurality of preambles of a lookup table of the transmitter, the first data stream being encrypted and the preambles of the plurality of data streams being unencrypted;
determining the existence of a plurality of data streams of the first type by detecting the receipt of a plurality of preambles for the data streams of the first type; and
handling each of the data streams of the first type according to the preamble for the data stream, where handling data of the first data stream according to the first preamble includes decrypting the first data stream.

21. The method of claim 20, further comprising separating the merged data streams of the first type prior to handling each of the data streams of the first type according to the preamble for the data stream.

22. The method of claim 20, wherein handling each of the data streams of the first type further includes handling the second data stream of the first type without decrypting the second data stream.

23. The method of claim 20, wherein handling each of the data streams of the first type includes directing the first data stream to a first element and directing the second data stream to a second element.

24. The method of claim 23, wherein the first element is a part of a first apparatus or system including the receiver, and the second element is external to the first apparatus or system.

25. A non-transitory computer-readable medium having stored thereon data representing sequences of instructions that, when executed by a processor, cause the processor to perform operations comprising:
obtaining a plurality of data streams to be transmitted via a single interconnect over a first communication channel, the plurality of data streams including a first data stream and a second data stream, the first data stream and the second data stream each containing a first type of data;
choosing a first preamble to identify the first data stream and a second preamble to identify the second data stream, the first preamble and the second preamble chosen either from a plurality of preamble inputs to a multiplexer or from a plurality of preambles of a lookup table, the first preamble and the second preamble each having a predetermined number of clock periods, the first and second preambles uniquely identifying the first data stream and the second data stream among data streams of the first type for transmission, wherein the first preamble is distinguishable from the second preamble;
inserting the first preamble to precede the first data stream and the second preamble to precede the second data stream;
merging the first data stream and the second data stream together for transmission, wherein merging the first data stream and the second data stream includes inserting the second data stream into unused space of the first data stream; and
transmitting via the single interconnect over the first communication channel; and
transmitting via the single interconnect over the first communication channel:
an element to identify the first type of data,
the first data stream, wherein the first data stream is preceded by the first preamble, the first data stream being encrypted for transmission and the first preamble being unencrypted, and
the second data stream, wherein the second data stream is preceded by the second preamble, the second preamble being unencrypted.

26. A non-transitory computer-readable medium having stored thereon data representing sequences of instructions that, when executed by a processor, cause the processor to perform operations comprising:
receiving plurality of merged data streams via a single interconnect over a first communication channel at a receiver, wherein the merged data streams include a first data stream and a second data stream merged by the insertion of the second data stream into unused space of the first data stream, the plurality of data streams including a designation to identify a first type of data, each of the plurality of data streams of the first type being preceded by a preamble having a predetermined number of clock periods to identify each of the different data streams of the first type and to distinguish each of the data streams from each other of the plurality of data streams, the preamble for each of the data streams of the first type being unique among the plurality of data streams of the first type, the first data stream having a first preamble and the second data stream having a second preamble, the first preamble and the second preamble chosen either from a plurality of preamble inputs to a multiplexer of a transmitter or from a plurality of preambles of a lookup table of the transmitter, the first data stream being encrypted and the preambles of the plurality of data streams being unencrypted;

determining the existence of a plurality of data streams of the first type by detecting the receipt of a plurality of preambles for the data streams of the first type; and handling each of the data streams of the first type according to the preamble for the data stream, where handling data of the first data stream according to the first preamble includes decrypting the first data stream.

27. The apparatus of claim 1, wherein the first data stream is larger than the second data stream.

28. The apparatus of claim 10, wherein the second data stream is unencrypted, and wherein handling the second data stream based on the second preamble includes handling the second data stream without decryption.

29. The apparatus of claim 10, wherein the first data stream is larger than the second data stream.

30. The apparatus of claim 1, wherein the processing element is further to create the second data stream from received data.

31. The apparatus of claim 30, wherein creating the second data stream includes using a sampling rate for the received data that is low enough to allow insertion of the second data stream into the first data stream.

32. The method of claim 18, further comprising creating the second data stream from received data.

33. The method of claim 32, wherein creating the second data stream includes applying a sampling rate for the received data that is low enough to allow insertion of the second data stream into the first data stream.

\* \* \* \* \*